United States Patent [19]
Nicewonger

[11] 4,084,575
[45] Apr. 18, 1978

[54] SOLAR HEATER UNIT

[76] Inventor: Dwight Harold Nicewonger, Rte. 1, Box 495H, Ramona, Calif. 92065

[21] Appl. No.: 722,566

[22] Filed: Sep. 13, 1976

[51] Int. Cl.² ............................................. F24J 3/02
[52] U.S. Cl. ................................... 126/270; 126/271
[58] Field of Search ................ 126/270, 271; 237/1 A

[56] References Cited

U.S. PATENT DOCUMENTS

| | | | |
|---|---|---|---|
| 3,053,248 | 9/1962 | Daymon | 126/270 |
| 3,232,795 | 2/1966 | Gillette | 136/89 |
| 3,234,931 | 2/1966 | Whitaker | 126/270 |
| 3,236,277 | 2/1966 | Steinberg | 126/270 |
| 3,310,102 | 3/1967 | Trombe | 165/133 |
| 3,412,728 | 11/1968 | Thomason | 126/270 |
| 3,902,474 | 9/1975 | Pyle | 126/271 |
| 4,016,861 | 4/1977 | Taylor | 126/400 |

*Primary Examiner*—Carroll B. Dority, Jr.
*Attorney, Agent, or Firm*—Brown & Martin

[57] ABSTRACT

A solar heating unit employing plural cells each comprising sloping side walls with a first side wall having a sun facing relationship in the morning hours and a second side wall having a sun facing relationship in the afternoon hours. The first and second walls are inclined from the horizontal to a degree determined by the latitude of the unit.

9 Claims, 7 Drawing Figures

SOLAR HEATER UNIT

BACKGROUND OF THE INVENTION

Solar heaters of various designs have been operated for many years. A typical solar energy device comprises a flat plate collector utilizing a series of black coated tubes under a glass faced enclosure to heat water running through the tubes. Such units must be inclined for maximum efficiency to an angle dependent upon the latitude of their use. They are generally placed facing approximately true south. Such an orientation is a compromise between the ideal orientation for the morning and afternoon hours. Therefore, the unit is operating at less than peak efficiency at all but the mid-day hours. Further, such a unit is inefficient in heating air. Therefore, where hot air heating is to be employed in the heated building, a heat exchanger must be provided for transferring heat from the water to air. When utilized on homes having a south facing roof of approximately the right inclination, such units are merely bolted to the roof surface. However, for buildings with flat or gradually sloping roofs, the units must be held at the proper inclination by racks or other structures.

Solar energy devices that track the sun have been devised. In a typical tracking device, a photosensor detects the orientation of the sun and commands a motor to rotate and elevate the platform holding the solar energy device in such a manner that a perfect sun orientation is constantly maintained. Tracking devices are relatively complicated and expensive. Since the entire solar energy device must be mounted for movement, they are limited in their application to light weight solar energy devices that concentrate the sun's rays such as by a parabolic mirror.

Therefore, it is desirable to have a solar energy device that is adaptable to utilizing air as the working fluid and that maintains an effective portion of the solar energy device in sun facing relationship during a high percentage of the day light hours. Such a solar heater is particularly desirable where it is adaptable to solar heaters on flat roofs.

SUMMARY OF THE INVENTION

In an exemplary embodiment of the invention, a solar heater utilizing air as the working fluid incorporates a plurality of heating cells. Intersecting panels extending across the width of the unit form the cells. Each cell comprises a semi-enclosed space with sloping side walls. The side walls are joined to form a substantially square horizontal cross section. The cell is oriented with its rearward walls generally south facing so that a diagonal extending from the juncture of rearward walls to the juncture of the forward walls is oriented approximately true south. The rearward walls slope upwardly from the horizontal at an angle dependent upon the latitude of the installation. The range of angulation for the rearward walls is from approximately 20° to 60°. A plurality of cells adjoin one another so that a front wall of one cell forms a rear wall of an adjacent cell. At least the south facing walls are black coated to absorb and convert to heat a high percentage of the sun's energy. The entire solar heater is covered by glass or other glazing extending across the width and length of the solar energy unit and positioned above the tops of the individual cells a sufficient distance to provide a path for heated air.

During operation in the winter, as the sun rises in the morning the side walls in each cell that is south-easterly oriented so that a good sun facing relationship with a good vertical inclination, is obtained very early in the day. As the sun moves to a more direct southerly orientation during the day, both of the side walls come into effect. The vertical inclination of the side walls is such that maximum benefit from the winter sun is obtained. In the afternoon hours, the south-westerly facing side wall is positioned to have a good sun facing relationship.

The present invention is an improvement over existing solar heaters and is capable of delivering a heated working fluid throughout a higher number of daylight hours than comparable devices. The ability to deliver heated air over a larger number of daylight hours makes it practical to utilize the device without substantial storage capability. Since, in household applications, the building temperature is normally allowed to fall off naturally during the evening hours, the solar energy device will produce the needed heating effect during a high percentage of the actual heating day. Where storage capability is provided in this system, the storage capacity may be less than with other devices since during a high percentage of daylight hours, the heat as required in the building may be delivered directly from the heater unit.

The invention is especially well adpated to installations on flat roofs. In such a flat roof installation, the proper vertical inclination for maximum winter heating benefit may be obtained without elaborate racks. Since the side walls extend across the width of the heater unit, they may be made self-supporting by an intersecting relationship with the oppositely directed side walls. The unit does not require sophisticated material. The height of the side walls may be determined by its compatibility with readily available ducting and the like.

The invention and its many attendant advantages will be more fully understood by a reading of the following detailed description together with the drawings, in which like reference numerals refer to like parts throughout and in which:

DETAILED DESCRIPTION OF THE DRAWINGS

Figure 1:
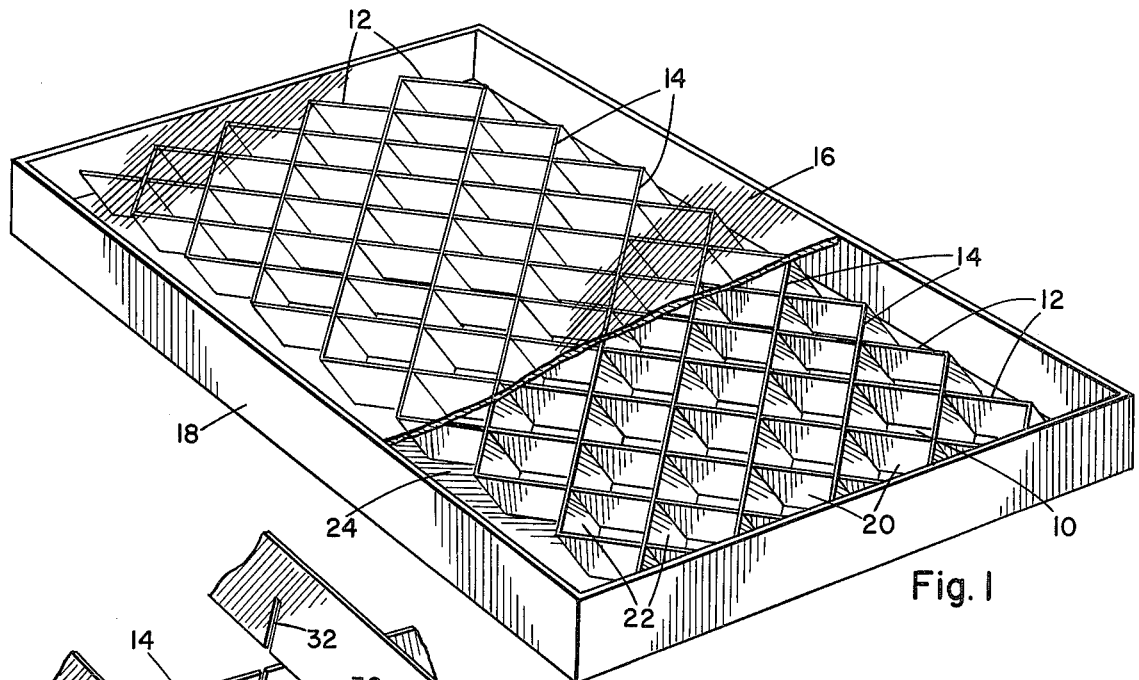
FIG. 1 is a perspective view of the solar heater with a portion of the transparent cover cut away.
Figure 2:
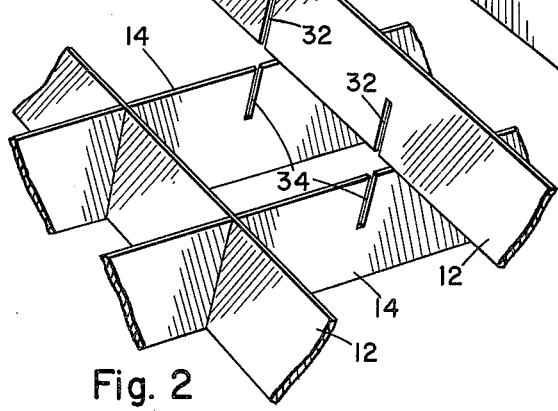
FIG. 2 illustrates a typical assembly of the side wall panels.

Referring to the drawings, there is illustrated the solar heater unit comprising a plurality of cells 10. The cells are formed by intersecting panels 12 and 14 which extend across the entire width of the heater. The structure is contained in a casing 18, the top of which is enclosed by a transparent glazing panel 16. The intersecting panels form individual cells with generally south facing rear walls 20 and 22 and a floor section 24. In horizontal cross section, the cell shape is that of a square with the diagonal between rear south facing and front north facing walls being oriented toward the south. At least the south facing surfaces 20 and 22 of the aluminum sheet are painted black to absorb and convert the sun's energy into heat. It may also be desirable to paint the floor 24 of each cell to convert heat at high sun angles, such as during the summer months. A further, but relatively smaller increase in efficiency may be obtained by painting the rearward facing surfaces of the adjoining panels, so that heat radiated from the south facing panels or floor 24 will be captured and converted into heat.

Figure 4:
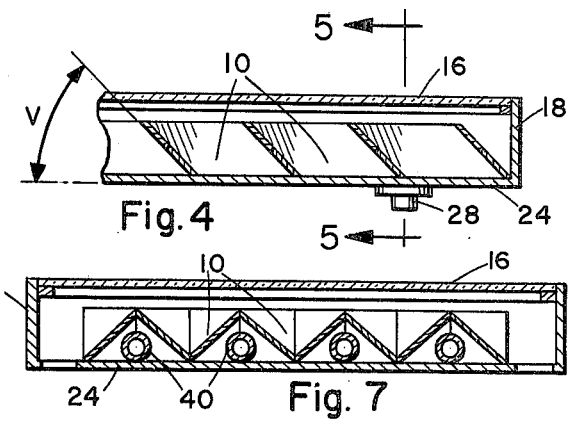
FIG. 4 is a sectional view taken on line 4—4 of FIG. 3.

As illustrated in FIG. 4, the vertical inclination V of the south facing walls is approximately 45°. The exact angle of the inclination is dependent upon the latitude of the installation. According to generally accepted practice, the inclination is approximately 10° greater than the latitude. Accordingly, for 35° north latitude, the installation would have south facing walls inclined 45° to the horizontal. It will be understood that the term "south facing" in the specification and claims is adapted for clarity and that a similar but north facing configuration would be utilized in the southern hemisphere.

Figure 6:
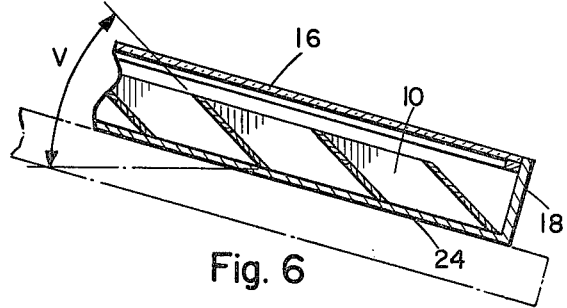
FIG. 6 is a sectional view similar to FIG. 4 showing the unit adapted to a sloping roof.
Figure 3:
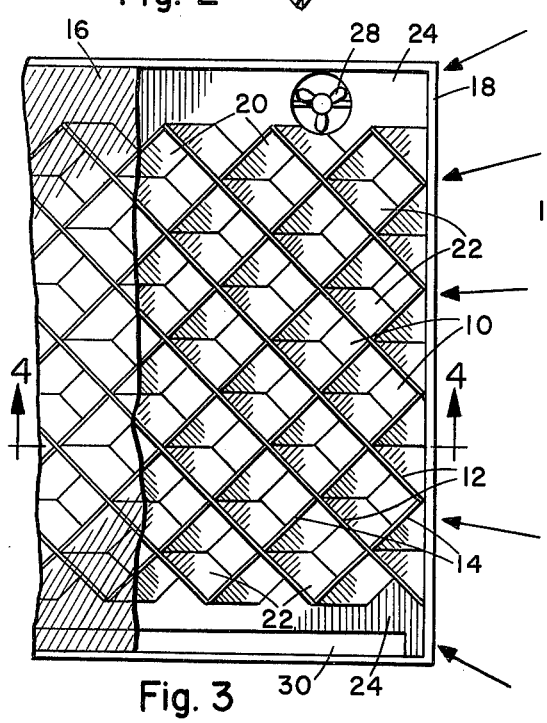
FIG. 3 is a top plan view of one end of the solar heater.

FIG. 6 illustrates an installation on a sloping roof. As will be apparent from the drawing, the inclination of a roof surface is insufficient to produce a proper inclination of the heated surfaces. However, the combined angulation of the roof and panels produces an overall angulation V of the 15° corresponding to the correct inclination for 35° north latitude.

Figure 5:
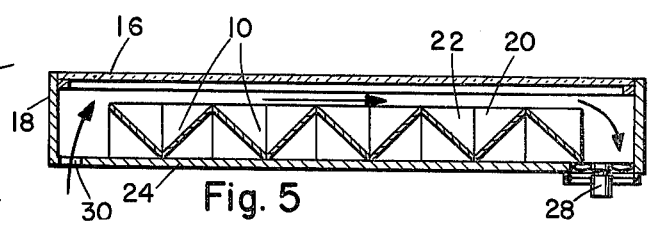
FIG. 5 is a sectional view taken on line 5—5 of FIG. 4.

FIG. 5 illustrates the manner in which a fan 28 draws air over the heater unit. Air is drawn through port 30 from the interior of the heated building and passes between the glazing 16 and the cells 10 so that air heated within the cells is picked up by the air stream travelling between the glazing and the cells so that air is drawn out of the heater unit by the fan 28 is considerably elevated in temperature. The heated air may then be directed into the building itself or a portion of the heated air may be directed to a heat storage area, such as a rock storage bin.

The assembly and installation of the heater is facilitated by the use of the diagonal panels 12 and 14, which may be assembled together through the use of cooperating slots 32 and 34. It has been found advantageous to employ panels 12 and 14 which result in an overall height of the assembled cells of 12 inches. In this manner, conventional 12 inch ducting easily mates with the heater unit. Where as overall height of 12 inches is embloyed, approximately 4 inches is provided between the upper surfaces of the cells 10 and the glazing 16. Such a distance provides for adequate mixing between the incoming air and the heated air and a low resistance flow path across the top of the heater unit and back into the heated building. The interlocking relationship between the diagonal panels 12 and 14 makes it possible to use relatively low gauge duct material such as aluminum sheet.

Figure 7:
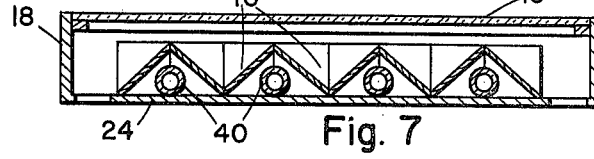
FIG. 7 is a sectional view similar to FIG. 5, showing a modified version of the invention for use with water as a working fluid.

Referring now to FIG. 7, a modified form of the invention adapted to utilize water as the working fluid is illustrated. A plurality of water carrying tubes 40 run longitudinally through the unit. The diagonal panels are arranged in substantially the same manner as with an air operated unit excepting that the plurality of cells 10 now form fins on the tubes 40. The cells are in heat conducting contact with the tubes so that the sun's energy, converted to heat by the cells 10, is now directly conducted to the tubes 40 and through the pipes to the water therein. The most commonly available tubing for such an installation utilizes half inch in diameter tubing. Accordingly, the scale of the cells and panels is reduced from the exemplary air embodiment, so that the overall height of the individual cells is approximately 1 inch. However, despite the difference in overall height, the same size and orientation relationship between the side walls is maintained. The device presents a pair of generally south facing walls including a south-easterly and south-westerly oriented wall. Thus, the device begins to produce heat effectively earlier in the morning and continues to produce heat effectively later in the day than conventional flat plate collectors.

Having described my invention, I now claim:

1. A solar heating unit being adapted for mounting in proximity to a heated building comprising:
    a planar floor section,
    a plurality of intersecting panels positioned on said floor section and forming a plurality of cells,
    means interconnecting said panels at the intersections of said panels,
    each of said cells having mutually abutting rear side walls and front side walls, said rear side and front side walls being at an acute angle to said planar floor section,
    each cell including a front side wall and a rear side wall that are in parallel planes,
    at least some of said side walls of each cell being coated black,
    a cover means over said cells for admitting light energy and retaining heated air,
    circulation means for circulating a working fluid in heat transfer relationship with said cells for extracting heat converted from solar energy by said cells and for delivering said extracted heat to the heated building.

2. The solar heating unit of claim 1 wherein:
    said side walls are inclined from the horizonal by approximately 20° to 60°.

3. The solar heating unit of claim 1 wherein:
    said side walls are inclined from the horizontal by an angle of 10° greater than the latitude of the heated building.

4. The solar heating unit of claim 1 wherein:
    said cover means is spaced from the upper surface of said cells,
    said circulation means comprises a fan for moving air over between said cover means and said cells.

5. The solar heating unit of claim 1 wherein:
    said panel interconnecting means includes interfitting cooperating slots.

6. The solar heating unit of claim 1 wherein: said circulating means includes
    tubing means in heat conducting relationship with said rear side walls for transferring heat from said side walls to fluid in said tubing.

7. The solar heating unit of claim 1 wherein:
    said cover means comprises a glazing over said cells.

8. The solar heating unit of claim 3 wherein:
    said cover means is spaced from the upper surface of said cells,
    said circulation means comprises a fan for moving air over between said cover means and said cells,
    and said panel interconnecting means includes interfitting cooperating slots.

9. The solar heating unit of claim 8 wherein:
    said cover means comprises a glazing over said cells.